US010607209B2

(12) United States Patent
Drake et al.

(10) Patent No.: US 10,607,209 B2
(45) Date of Patent: Mar. 31, 2020

(54) SYSTEM AND METHOD FOR TRANSFERRING PAYMENTS AND DOCUMENTS WITH A WEB-BASED MANAGEMENT SYSTEM

(71) Applicant: TGALLISON Technologies, LLC, Marietta, GA (US)

(72) Inventors: Bernardine W. Drake, Marietta, GA (US); Glenn F. Drake, Marietta, GA (US)

(73) Assignee: TGALLISON TECHNOLOGIES, LLC, Marietta ( * ) Notice: Subject to any disclaimer, the term of this patent is extended or adjusted under 35 U.S.C. 154(b) by 692 days.

(21) Appl. No.: 14/208,953

(22) Filed: Mar. 13, 2014

(65) Prior Publication Data

US 2014/0279488 A1  Sep. 18, 2014

Related U.S. Application Data

(60) Provisional application No. 61/790,355, filed on Mar. 15, 2013, provisional application No. 61/822,791, (Continued)

(51) Int. Cl.
  G06Q 20/32  (2012.01)
  G06Q 20/04  (2012.01)

(52) U.S. Cl.
  CPC ....... *G06Q 20/3223* (2013.01); *G06Q 20/042* (2013.01)

(58) Field of Classification Search
  USPC ......................................................... 705/42
  See application file for complete search history.

(56) References Cited

U.S. PATENT DOCUMENTS 7,191,149 B1 *  3/2007  Lanham ............... G06Q 20/027
                                                     705/38
7,500,602 B2 *  3/2009  Gray ..................... G06Q 20/10
                                                     235/375

(Continued)

OTHER PUBLICATIONS

J. Qu, W. Liu and F. Cong, "Initial analysis on the security of electronic commerce payment instrument," 2013 25th Chinese Control and Decision Conference (CCDC), Guiyang, 2013, pp. 4037-4041. http://ieeexplore.ieee.org/stamp/stamp.jsp?tp=&arnumber=6561657&isnumber=6560882 (Instrument).*

(Continued)

*Primary Examiner* — Chikaodinaka Ojiaku
(74) *Attorney, Agent, or Firm* — Troutman Sanders LLP; Ryan Schneider

(57) ABSTRACT

Computer-implemented systems and methods for transferring images of a negotiable bank instrument and related information from one user to a second user at a remote location for review and verification by the second user are disclosed. The system can also enable the second user to variously utilize the information and images of the negotiable bank instrument for electronic deposit of funds in an account at a financial institution. The images can be transmitted to a financial institution for electronic deposit into an account. The images can also be converted into an image replacement document (IRD) which can then be transmitted to a financial institution for electronic deposit into an account. The images can also be transmitted to a third party processor for generation of the image replacement document, among other things.

25 Claims, 12 Drawing Sheets

Related U.S. Application Data filed on May 13, 2013, provisional application No. 61/869,531, filed on Aug. 23, 2013.

(56) References Cited

U.S. PATENT DOCUMENTS

| | | | | |
|---|---|---|---|---|
| 7,835,960 B2* | 11/2010 | Breck | G06Q 10/04 | 705/35 |
| 7,873,572 B2* | 1/2011 | Reardon | G06Q 20/10 | 705/35 |
| 8,639,602 B2* | 1/2014 | Rao | G06Q 20/108 | 705/35 |
| 8,688,579 B1* | 4/2014 | Ethington | G06Q 20/0425 | 705/42 |
| 2002/0060246 A1* | 5/2002 | Gobburu | G06Q 20/04 | 235/462.46 |
| 2002/0120582 A1* | 8/2002 | Elston | G06Q 20/04 | 705/64 |
| 2003/0119478 A1* | 6/2003 | Nagy | G06Q 20/04 | 455/408 |
| 2004/0034583 A1* | 2/2004 | Lanier | G06Q 20/10 | 705/35 |
| 2004/0148189 A1* | 7/2004 | Stoffelsma | G06Q 10/30 | 705/22 |
| 2005/0097046 A1* | 5/2005 | Singfield | G06Q 20/1085 | 705/42 |
| 2005/0121513 A1* | 6/2005 | Drummond | G06F 9/548 | 235/381 |
| 2005/0267843 A1* | 12/2005 | Acharya | G06K 17/00 | 705/42 |
| 2005/0289059 A1* | 12/2005 | Brewington | G06Q 20/042 | 705/45 |
| 2006/0149671 A1* | 7/2006 | Nix | G06Q 20/04 | 705/40 |
| 2006/0206709 A1* | 9/2006 | Labrou | G06Q 20/18 | 713/167 |
| 2006/0253335 A1* | 11/2006 | Keena | G06Q 20/04 | 705/37 |
| 2007/0011089 A1* | 1/2007 | DeSchryver | G06Q 20/04 | 705/39 |
| 2007/0106612 A1* | 5/2007 | O'Brien | G06Q 20/02 | 705/44 |
| 2007/0156577 A1* | 7/2007 | Lanham | G06Q 20/027 | 705/38 |
| 2007/0233615 A1* | 10/2007 | Tumminaro | G06Q 20/12 | 705/75 |
| 2007/0239565 A1* | 10/2007 | Pentel | G06Q 10/02 | 705/17 |
| 2007/0244811 A1* | 10/2007 | Tumminaro | G06Q 20/10 | 705/39 |
| 2007/0255653 A1* | 11/2007 | Tumminaro | G06Q 20/10 | 705/39 |
| 2007/0255662 A1* | 11/2007 | Tumminaro | G06Q 20/027 | 705/79 |
| 2007/0267479 A1* | 11/2007 | Nix | G06Q 20/10 | 235/379 |
| 2008/0006685 A1* | 1/2008 | Rackley, III | G06Q 20/10 | 235/379 |
| 2008/0010190 A1* | 1/2008 | Rackley, III | G06Q 20/042 | 705/39 |
| 2008/0010191 A1* | 1/2008 | Rackley, III | G06Q 20/042 | 705/39 |
| 2008/0010192 A1* | 1/2008 | Rackley, III | G06Q 20/042 | 705/39 |
| 2008/0010193 A1* | 1/2008 | Rackley, III | G06Q 20/042 | 705/39 |
| 2008/0010196 A1* | 1/2008 | Rackley, III | G06Q 20/102 | 705/40 |
| 2008/0010204 A1* | 1/2008 | Rackley, III | G06Q 20/042 | 705/45 |
| 2008/0010215 A1* | 1/2008 | Rackley, III | G06Q 20/042 | 705/70 |
| 2008/0040261 A1* | 2/2008 | Nix | G06Q 20/04 | 705/39 |
| 2008/0040265 A1* | 2/2008 | Rackley, III | G06Q 20/02 | 705/40 |
| 2008/0126145 A1* | 5/2008 | Rackley, III | G06Q 20/102 | 455/406 |
| 2008/0162224 A1* | 7/2008 | Coon | G06Q 10/0639 | 705/7.38 |
| 2008/0207203 A1* | 8/2008 | Arthur | G06Q 20/322 | 455/435.1 |
| 2008/0207234 A1* | 8/2008 | Arthur | G06Q 20/20 | 455/466 |
| 2008/0208741 A1* | 8/2008 | Arthur | G06Q 20/105 | 705/41 |
| 2008/0208742 A1* | 8/2008 | Arthur | G06Q 20/105 | 705/41 |
| 2008/0208743 A1* | 8/2008 | Arthur | G06Q 20/105 | 705/41 |
| 2008/0208744 A1* | 8/2008 | Arthur | G06Q 20/105 | 705/41 |
| 2008/0208762 A1* | 8/2008 | Arthur | G06Q 20/027 | 705/79 |
| 2008/0242274 A1* | 10/2008 | Swanburg | G06Q 20/3223 | 455/414.1 |
| 2008/0268811 A1* | 10/2008 | Beenau | G06Q 20/32 | 455/406 |
| 2008/0270302 A1* | 10/2008 | Beenau | G06Q 20/108 | 705/42 |
| 2009/0036103 A1* | 2/2009 | Byerley | G06Q 20/32 | 455/414.1 |
| 2009/0119190 A1* | 5/2009 | Realini | G06Q 20/04 | 705/30 |
| 2009/0190823 A1* | 7/2009 | Walters | G06K 9/186 | 382/137 |
| 2010/0161466 A1* | 6/2010 | Gilder | G06Q 20/04 | 705/34 |
| 2010/0161489 A1* | 6/2010 | Goodall | G06Q 20/042 | 705/45 |
| 2011/0134248 A1* | 6/2011 | Heit | G06Q 20/04 | 348/161 |
| 2011/0173060 A1* | 7/2011 | Gallagher | G06Q 20/0425 | 705/14.27 |
| 2011/0320358 A1* | 12/2011 | Harris | G06Q 20/042 | 705/45 |
| 2012/0041877 A1* | 2/2012 | Rao | G06Q 20/108 | 705/43 |
| 2012/0259778 A1* | 10/2012 | Banerjee | G06Q 20/10 | 705/43 |
| 2013/0054451 A1* | 2/2013 | Maley | G06Q 40/02 | 705/40 |
| 2013/0097076 A1* | 4/2013 | Love | G06Q 20/0425 | 705/42 |
| 2013/0103582 A1* | 4/2013 | Singfield | G06Q 20/042 | 705/43 |
| 2013/0246285 A1* | 9/2013 | Chayun | G06Q 10/20 | 705/305 |
| 2014/0250000 A1* | 9/2014 | Fellerman | G06Q 20/04 | 705/39 |
| 2014/0279488 A1* | 9/2014 | Drake | G06Q 20/3223 | 705/42 |

OTHER PUBLICATIONS

D. Sciglimpaglia and D. Ely, "Internet banking: a customer-centric perspective," Proceedings of the 35th Annual Hawaii International Conference on System Sciences, Big Island, HI, 2002, pp. 2420-2429. (Internet Banking) (Year: 2002).*

* cited by examiner

SYSTEM AND METHOD FOR TRANSFERRING PAYMENTS AND DOCUMENTS WITH A WEB-BASED MANAGEMENT SYSTEM

CROSS REFERENCE TO RELATED APPLICATIONS

This application claims priority to and benefit under 35 U.S.C. § 119(e) of U.S. Provisional Patent Application Ser. No. 61/790,355, entitled, "System and Method for Transferring Payments and Documents with a Web-Based Management System" filed Mar. 15, 2013; U.S. Provisional Patent Application Ser. No. 61/822,791, entitled, "System and Method for Transferring Payments and Documents with a Web-Based Management System" filed May 13, 2013; and U.S. Provisional Patent Application Ser. No. 61/869,531, entitled, "System and Method for Transferring Payments and Documents with a Web-Based Management System" filed Aug. 23, 2013, all of which are hereby incorporated by reference as if fully set forth below.

BACKGROUND OF THE INVENTION

1. Field of the Invention

Embodiments of the present invention relate generally to computer-implemented methods for transferring images of negotiable bank instruments and related information from a first user to a second user at a remote location for review and verification by the second user, and more specifically to those methods in which the second user is able to use the received images and information for electronic deposit at a first financial institution upon successful review and verification of the received images and information.

2. Background of Related Art

In an agent-broker relationship, there are often financial transactions that involve, or require, the transfer of a negotiable bank instrument, such as, for example, a check, between the agent and broker. In a real estate transaction involving the sale of real property, for example, checks need to be transferred between a real estate salesperson (sometimes referred to as an "agent" or "Realtor") and a broker in order to complete the sale and transfer of property between the buyer and seller. The salesperson is an agent of the real estate broker, interacts with buyers to find suitable real property, and can assist with making offers to purchase property, negotiating terms of the purchase agreement, and filling out the purchase agreement. The broker is the legal agent of either the buyer or seller and bears legal and fiduciary responsibility for the purchase agreement. During the negotiation of the purchase agreement, the buyer often pays earnest money to either the buyer's broker or the seller's broker as a form of security deposit on the property. The buyer's salesperson usually has the earnest money check, generally made payable to the buyer's broker, in his possession during negotiations.

Once the contract to purchase the property is executed, the check is delivered by the agent to the agent's broker within the time frame specified by the contract. Timely delivery of the check to the broker is the agent's duty; failure to do so within the specified time frame can cause the purchase agreement to be nullified. Current options for providing the check to the broker involve physical delivery of the check itself, whether, for example, personally, by mail, courier, or electronic funds transfer. Personal delivery may not always be possible or preferable, and there are often fees and delays associated with the other options. Once the broker receives the earnest money check and the purchase agreement, the broker must review and verify the documents before depositing the check into his bank account (or a designee's bank account). The review and verification can consist of, for example and not limitation, determining which financial institution to utilize in the deposit, if there should be a delay in depositing the check, and whether the amount of the check matches the amount listed in the contract. If the check and/or agreement contain incorrect information, for example, the documents may be revised and resent to the broker before the broker deposits the funds.

In another example, tenants are contractually required to pay rent to their landlords and/or property managers at set time periods, often via check. Delivery of the check to the landlord or property manager is time-sensitive, as extra fees may be charged for failure to timely pay rent. Once again, personal delivery of the check to the landlord or property manager is not always possible or preferable, and mail or courier delivery, for example, may not be feasible. Once the check is received, the landlord or property manager must review and verify the check before depositing the check into his bank account or a designee's bank account, and can require the tenant to provide a corrected check if the first one is incorrect in some way. The tenant can receive a confirmation of the deposit that can be, for example, time- and/or date-stamped. In this example, batch review of multiple checks and automatic deposit of a large number of checks could be enabled by having multiple transactions simultaneously displayed for the landlord or property manager's review.

In another example, the purchase of an insurance policy requires transmission of payment from the purchaser to the insurance company, often via check. Many times, the purchaser interacts with an insurance company's agent, as opposed to directly with the insurance company, to discuss various policies and to select the appropriate types of coverage. The purchaser generally provides the check to the agent immediately after signing the policy, and the agent then passes the check and completed policy along to the insurance company. Personal delivery of the check to the insurance company is not always possible or preferable, and mail or courier delivery may not be feasible. Once the check is received, the insurance company must review and verify the check and policy before depositing the purchaser's check into its bank account. If there is an error with the check, the insurance company can require the purchaser to provide a corrected check.

In another example, a purchaser can invest in stocks, bonds, or mutual funds with the guidance of a stock broker, who is employed by a brokerage firm. When making the investment, the purchaser can provide a check to the broker along with instructions on the type and amount of stock, bond, or fund to purchase. Personal delivery of the check to the broker is not always possible or preferable, and mail or courier delivery may not be feasible. Once the check is received, the broker reviews and verifies the check and instructions and then deposits the check in the purchaser's account at the brokerage firm and carries out the purchaser's instructions.

Embodiments of the present invention can expand the capabilities of current mobile banking practices. Mobile banking was greatly enhanced by the implementation of the Check 21 Act in 2004. Under these new laws, banks were authorized to handle personal and commercial checks, money orders, and treasury checks electronically by taking an image of the front and back side of the check, plus associated payment information, and transmit the images and information to a receiving bank. The receiving bank then uses the images and information to create a "substitute check" or "image replacement document" that is the legal equivalent of the original check provided the necessary information is included in the document and is accurate. The image replacement document (IRD) contains an image of the front and back sides of the check as well as information extracted from the check, such as payor, payee, amount of the check, endorsements, and account information such as the bank routing number, account number, and check number. The IRD must also contain the required legend and all information encoded in the magnetic ink character recognition (MICR) line, which encodes the account information described above, the amount of the check, and the markings needed for a MICR reader to properly access that information. The financial institution that generates the IRD must also provide a warranty for the IRD, and must generate the IRD according to the standards set forth by the Accredited Standards Committee X9 (ASC X9).

ASC X9 is accredited by the American National Standards Institute (ANSI) and is responsible for developing and maintaining all financial services standards in the United States, such as security of online financial transactions, paper and electronic check requirements, credit and debit card transactions, and data security. ASC X9 has developed standards for capturing images of the negotiable bank instrument, generating IRDs and the information required to be contained in the digital image, which is listed above, and printing physical copies of IRDs. In order to generate the IRD, the financial institution must take an image of the front and back side of the negotiable bank instrument in accordance with the X9 standards, extract the required information, electronically endorse the instrument, and combine the foregoing into a digital image of the front and back side of the instrument. Since the IRD images contain more information than just the front and back side of the instrument, a printed version of the IRD images is necessarily larger than the physical copy of the instrument. Dimensions of acceptable printed IRDs are specified by ASC X9. Either a digital IRD or a printed IRD can be transmitted from the generating financial institution to another financial institution for payment of the negotiable bank instrument; to cut down on transportation time and paper usage, digital IRDs are generally preferred.

Since the IRD is the legal equivalent of the paper check, the need for physically transporting paper checks between banks is eliminated. Banks have also developed ways to allow their customers to remotely deposit checks. Today, customers can take digital images of checks using cameras on their mobile devices and transmit the images and account information to their bank for deposit into their specified account via an application on the mobile device. These digital images sent from the mobile device are converted into the IRD. The images of the check cannot, however, be transferred to a third party for review and verification or for deposit into the third party's specified bank account under current mobile banking practices.

What is needed, therefore, is a method for delivering images of negotiable bank instruments and information related to a financial transaction from a first user to a second user at a remote location, with the ability for the second user to review and verify the images and information prior to taking an action such as, for example, using the images to electronically deposit the funds into a first account at a first financial institution, hold the funds for deposit at a later date, or return the funds. The method should take advantage of mobile devices and current mobile banking practices that do not require exchange of physical negotiable bank instruments, yet improve those practices by allowing the opportunity for an entity to whom the instrument is directed to review and verify images of the instrument and related information before proceeding with additional processing. It is to such a method that embodiments of the present invention are primarily directed.

BRIEF SUMMARY OF THE INVENTION

Embodiments of the present invention relate generally to computer-implemented methods for transferring images of a negotiable bank instrument and related information from a first user to a second user at a remote location for review and verification by the second user and more specifically to those methods which also allow the second user to utilize the images of the negotiable bank instrument for, for example, electronic deposit of funds in a first account at a first financial institution, holding of funds, and the return of funds, as appropriate.

In some embodiments, the method can utilize wireless connections, for example and not limitation, cell phone towers, wide area networks, or local area networks. Some or all of the system can be hosted on a cloud computing environment.

In some embodiments, the method can enable the second user to utilize the images of the negotiable bank instrument for electronic deposit of funds in a first account at a first financial institution without the need for a physical copy of the negotiable bank instrument. In some embodiments, multiple negotiable bank instruments can be electronically deposited. Such utilization can occur upon, for example, successful review and verification of the images and the information received from the first user by the second user. In some embodiments, the back-end user can conduct a review and verification of a large number of checks by viewing multiple transactions simultaneously.

In another embodiment, the method can convert the images of the negotiable bank instrument into a format that can be utilized for electronic deposit of funds into a first account at a first financial institution. Such deposit can occur upon, for example, successful review and verification of the images and the information received from the first user by the second user.

Embodiments of the present invention can also comprise a method that enables the second user to transmit the images of the negotiable bank instrument to a third party processor for processing the images in order to electronically deposit funds into a first account at a first financial institution. Such transmission can occur upon, for example, successful review and verification of the images and the information received from the first user by the second user.

These and other objects, features, and advantages of the present invention will become more apparent upon reading the following specification in conjunction with the accompanying drawing figures.

BRIEF DESCRIPTION OF THE DRAWINGS

Various features and advantages of the present invention may be more readily understood with reference to the following detailed description taken in conjunction with the accompanying drawings.

DETAILED DESCRIPTION OF THE INVENTION

Figure 1A:
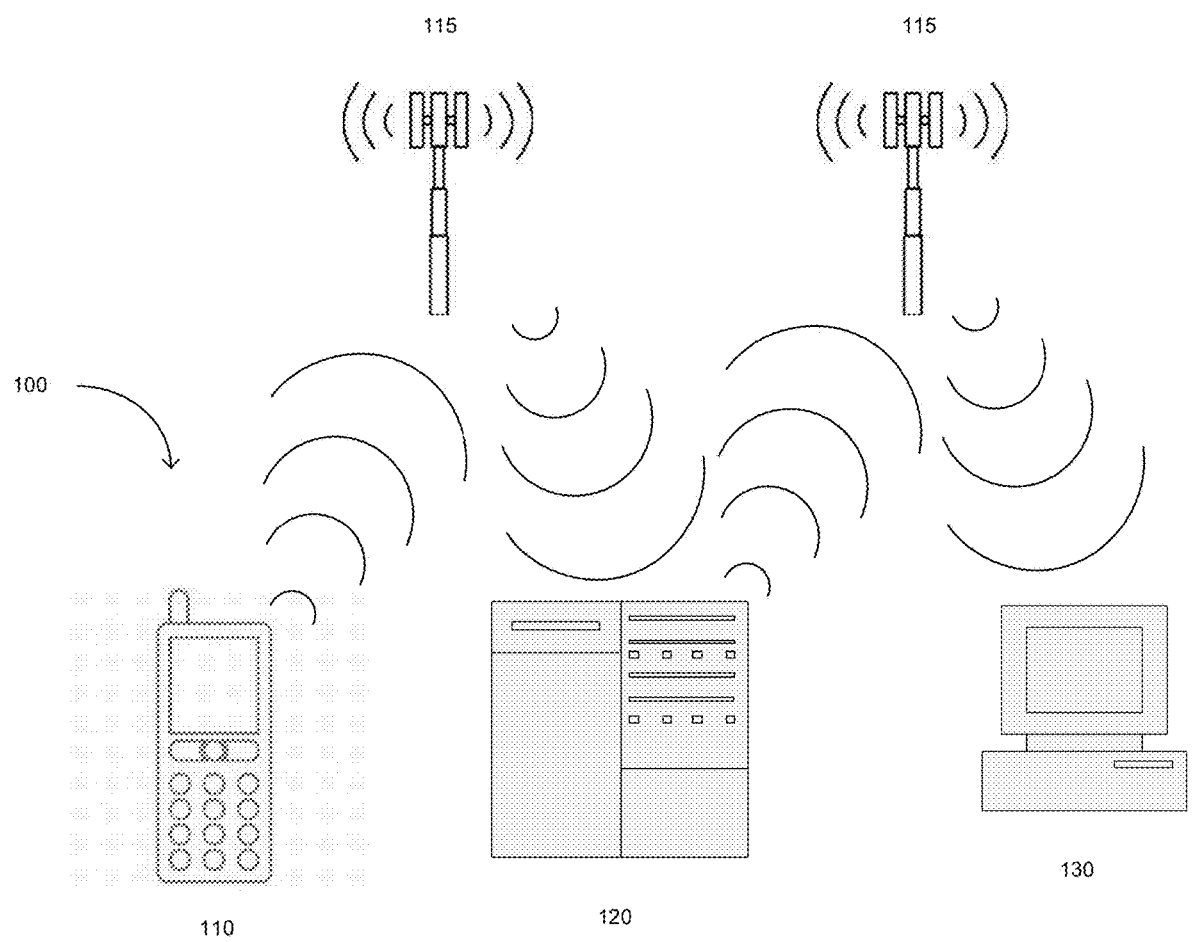
FIG. 1a depicts a first diagram representing a networked system including a mobile computing device, a server, and a application a second computing device, in accordance with some embodiments of the present invention.

Embodiments of the present invention relate generally to computer-implemented methods for transferring images of a negotiable bank instrument and related information from a first user to a second user at a remote location for review and verification by the second user and more specifically to those methods which also allow the second user to utilize the images of the negotiable bank instrument for, for example, electronic deposit of funds in a first account at a first financial institution, holding of funds, and the return of funds, as appropriate.

To facilitate an understanding of the principles and features of the various embodiments of the present invention, various illustrative embodiments are explained below. Although exemplary embodiments of the present invention are explained in detail, it is to be understood that other embodiments are contemplated. Accordingly, it is not intended that the present invention is limited in its scope to the details of construction and arrangement of components set forth in the following description or examples. The present invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents that operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described hereinafter as making up the various elements of the present invention are intended to be illustrative and not restrictive. Many suitable materials that would perform the same or a similar function as the materials described herein are intended to be embraced within the scope of the invention. Such other materials not described herein can include, but are not limited to, materials that are developed after the time of the development of the invention, for example. Any dimensions listed in the various drawings are for illustrative purposes only and are not intended to be limiting. Other dimensions and proportions are contemplated and intended to be included within the scope of the invention.

A problem with conventional methods of transmitting negotiable bank instruments between a first user and a second user at a remote location has been that physical copies of the negotiable bank instruments are often required to carry out subsequent, related financial transactions. Current mobile banking methods allow a first user to utilize a camera on a mobile device, for example, to record images of a negotiable bank instrument, such as a check, and then to electronically deposit those funds associated with the negotiable bank instrument into a desired account using conventional systems. The first user cannot, however, send the images of the negotiable bank instrument to a second user for that second user to utilize for electronic deposit into the second user's desired account. In other words, using current technology, users can only send images of negotiable bank instruments directly to a financial institution using dedicated applications.

The ability to send images of a negotiable bank instrument from a first user to a second user, and for the second user to then utilize the received images to review and/or electronically deposit the associated funds into a first account at a first financial institution therefore addresses a new aspect of mobile banking not embodied in the current technology. The ability of the second user to review and verify the images of the negotiable bank instrument, as well as information provided by the first user regarding details of the related financial transaction, is also new. Finally, the ability of the second user to provide input regarding the results of his review and verification, such as instructions to immediately proceed with electronic deposit, to hold the electronic deposit until a later date specified by either the first or second user, or to delete the images and information due to some inconsistency or error, is new.

In response, as shown in FIGS. 1-8, embodiments of the present invention relate generally to computer-implemented methods for transferring images of a negotiable bank instrument and related information from a first user to a second user (or, "back-end user") at a remote location for review and verification by the second user and more specifically to those methods which also allow the second user to utilize the images of the negotiable bank instrument for electronic deposit of funds in a first account at a first financial institution.

Referring now to the figures, various embodiments of the transfer methods will be described in detail.

FIG. 1a illustrates a diagram of an exemplary computer-implemented image transferring system 100, according to an exemplary embodiment of the present invention. In some embodiments, images of a negotiable bank instrument, such as, for example and not limitation, a check, and related financial information can be transmitted via a wired or wireless connection (for example and not limitation, via cell phone towers 115, wide area networks or local area networks) from a mobile device 110 used by a first, or "front-end," user to a server 120 via a mobile image and information capturing application on the mobile device 110. The mobile device 110 can include, for example and not limitation, mobile phones, tablets, laptop computers, or desktop computers that are located remotely from one another and, preferably, remotely from a central server 120 that can compile and process the received information and images. In an exemplary embodiment, the mobile image and information capturing application on the mobile device 110 may be configured to run on mobile telephones or other mobile devices, so that front-end users can capture images of negotiable bank instruments and answer questions related to the financial transaction regardless of their locations. In some embodiments, the server 120 can transmit the information and images to an application associated with the back-end user via a wired or wireless connection, for example. The application can be utilized on a computing device 130 such as for example and not limitation, a desktop computer, laptop computer, smartphone, mobile phone, or tablet. Some or all of the system 100 can be hosted in a cloud computing environment.

Figure 1B:
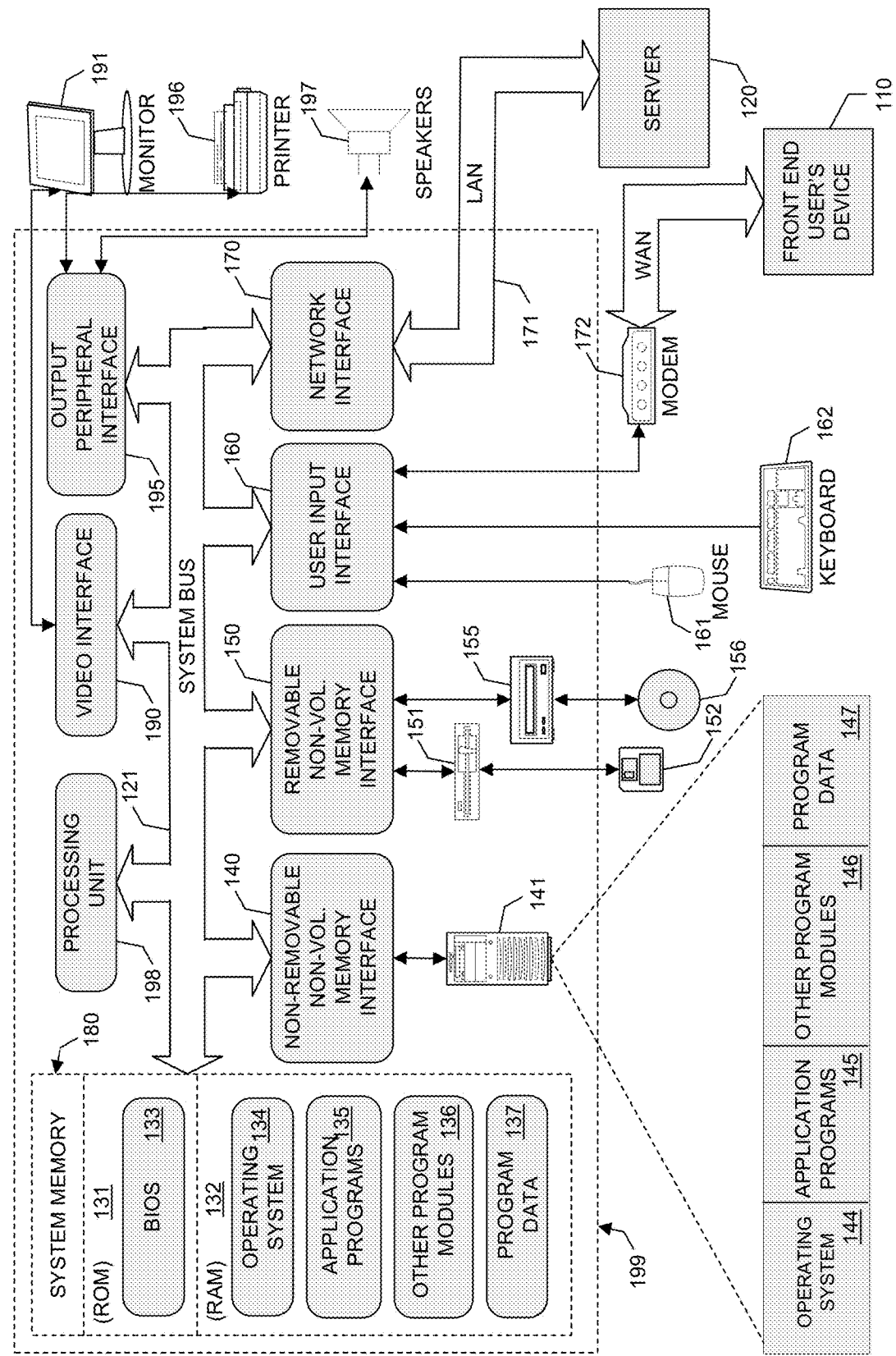
FIG. 1b depicts a diagram representing exemplary components of the second computing device, in accordance with some embodiments of the present invention.

FIG. 1b illustrates an exemplary computing device 130, according to an exemplary embodiment of the present invention. One or more aspects of the system 100 and related methods 600, 700, and 1000, discussed below, can be embodied in an application for use on the computing device 130. FIG. 1b illustrates an example of a suitable computing device 130 that can run such an application.

Although specific components of the computing device 130 are illustrated in FIG. 1b, the depiction of these components in lieu of others does not limit the scope of the invention. Rather, various types of computing devices can be used to implement embodiments of the system 100. Exemplary embodiments of the system 100 can be operational with numerous other general purpose or special purpose computing system environments or configurations.

Exemplary embodiments of the system 100 can be described in a general context of computer-executable instructions, such as one or more applications or program modules, stored on a computer-readable medium and executed by a computer processing unit. Generally, program modules can include routines, programs, objects, components, or data structures that perform particular tasks or implement particular abstract data types.

With reference to FIG. 1b, components of the computing device 130 can comprise, without limitation, a processing unit 198 and a system memory 180. A system bus 121 can couple various system components including the system memory 180 to the processing unit 198. The computing device 130 can include a variety of computer readable media. Computer-readable media can be any available media that can be accessed by the computing device 130, including volatile and nonvolatile, removable and non-removable media. Computer-readable media can comprise, for example and not limitation, computer storage media and communication media. Computer storage media can include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store data accessible by the computing device 130 and can store the application 130 itself. Communication media can include, for example and not limitation, wired media such as a wired network or direct-wired connection, and wireless media such as acoustic, RF, infrared and other wireless media. Combinations of any of the above can also be included within the scope of computer readable media.

The system memory 180 can comprise computer storage media in the form of volatile or nonvolatile memory such as read only memory (ROM) 131 and random access memory (RAM) 132. A basic input/output system 133 (BIOS), containing the basic routines that help to transfer information between elements within the computing device 130, such as during start-up, can typically be stored in the ROM 131. The RAM 132 typically contains data and/or program modules that are immediately accessible to and/or presently in operation by the processing unit 198. FIG. 1b illustrates, for example and not limitation, an operating system 134, application programs 135, other program modules 136, and program data 137.

The computing device 130 can also include other removable or non-removable, volatile or nonvolatile computer storage media. By way of example only, FIG. 1b illustrates a hard disk drive 141 that can read from or write to non-removable, nonvolatile magnetic media, a magnetic disk drive 151 for reading or writing to a nonvolatile magnetic disk 152, and an optical disk drive 155 for reading or writing to a nonvolatile optical disk 156, such as a CD ROM or other optical media. Other computer storage media that can be used in the exemplary operating environment can include magnetic tape cassettes, flash memory cards, digital versatile disks, digital video tape, solid state RAM, solid state ROM, and the like. The hard disk drive 141 can be connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1b can provide storage of computer readable instructions, data structures, program modules, and other data for the computing device 130. A hard disk drive 141, for example, is illustrated as storing an operating system 144, application programs 145, other program modules 146, and program data 147. These components can be the same as, or different than, the operating system 134, application programs 135, other program modules 136, and program data 137.

A web browser application program 135, or web client, can be stored on the hard disk drive 141 or other storage media. The web client 135 can request and render web pages, such as those written in Hypertext Markup Language, in another markup language, or in a scripting language. This can enable the computing device that can utilize the application 130, via the server 120 or other means, to access web-based applications, for example, as necessary.

A back-end user can enter instructions and information such as, for example and not limitation, acceptance of the information and images. The information can be entered into the computing device 130 using input devices such as a keyboard 162 and/or pointing device 161, commonly referred to as a mouse, trackball, or touch pad. Other input devices (not shown) can include a microphone, joystick, game pad, satellite dish, scanner, electronic white board, or the like. These and other input devices can be connected to the processing unit 198 through a user input interface 160 coupled to the system bus 121, or can be connected by other interface and bus structures, such as a parallel port, game port, or a universal serial bus. A monitor 191 or other type of display device can also be connected to the system bus 121 via an interface, such as a video interface 190. In addition to the monitor, the computing device that can utilize the application 130 can also include other peripheral output devices such as speakers 197 and a printer 196, for example, for printing receipts. These can be connected through an output peripheral interface 195.

The computing device 130 can operate in a networked environment, and be in communication with one or more remote computers over a network. As mentioned above, the computing device 130 can be in communication with the server 120, via, for example, a controller area network (CAN), OBD-II connection, or other suitable means. The computing device 130 can also be in communication with the server 120 via other suitable wireless or wired means. The server 120 can be a personal computer, a server, a router, a network PC, a peer device, or other common network node, and can include many or all of the elements described above relative to the computing device 130.

When used in a LAN networking environment, the computer 130 can be connected to the LAN 171 through a network interface or adapter 170. When used in a WAN networking environment, the computer 130 can include a modem 172 or other means for establishing communications over the WAN 173. The modem 172, which can be internal or external, can be connected to the system bus 121 via the user input interface 160 or other appropriate mechanism. In a networked environment, program modules depicted relative to the computing device 130 can be stored in the remote memory storage device. FIG. 1b illustrates possible remote application programs 132 as residing on memory storage device 141. It will be appreciated that the network connections shown are exemplary and other means of establishing a communications link between the computing device 130, the front end user's device 110, and the server 120 can be used.

Figure 2:
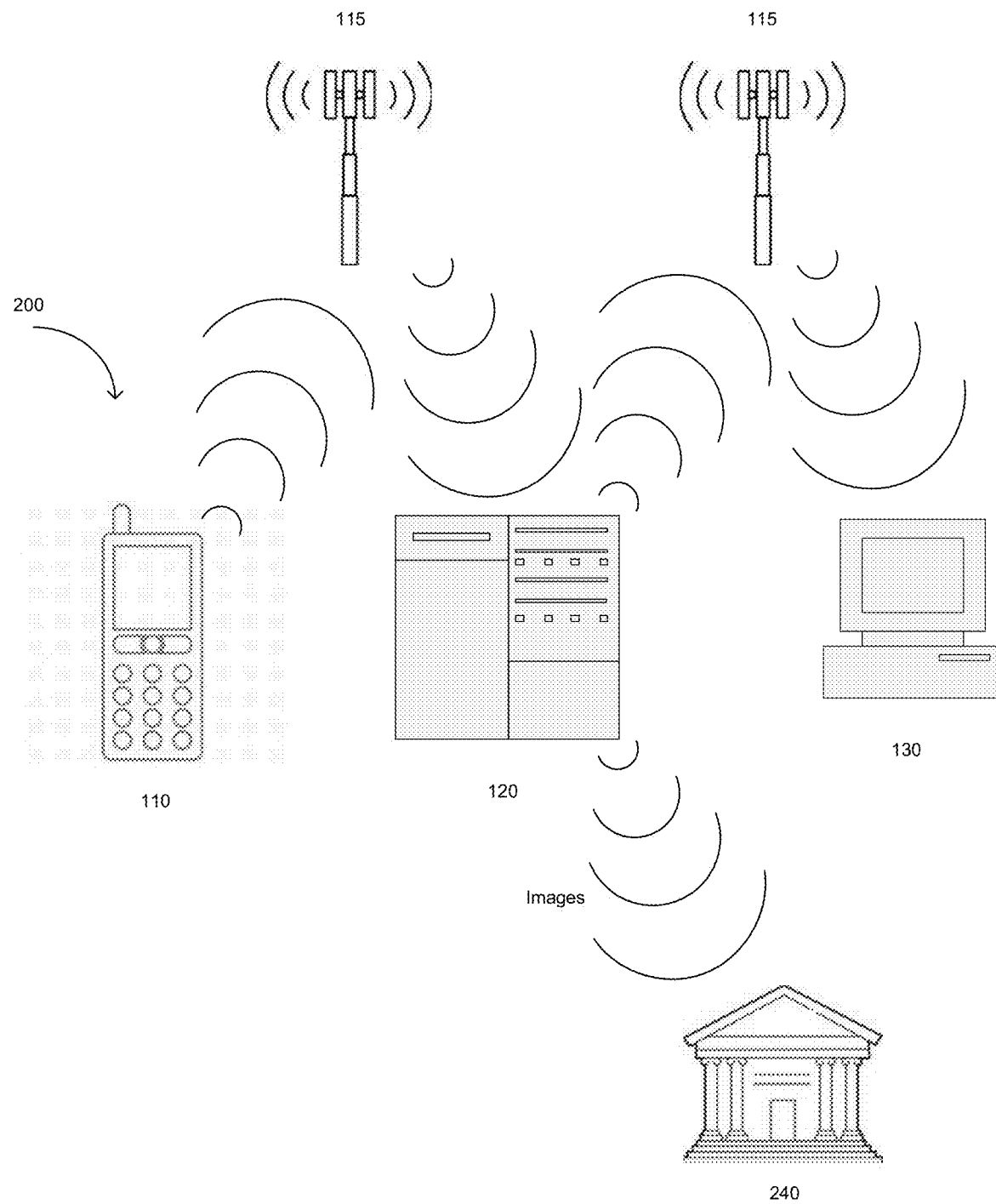
FIG. 2 depicts a system in which the server transmits received images of a negotiable bank instrument to a first financial institution, in accordance with some embodiments of the present invention.

FIG. 2 illustrates a diagram of an exemplary computer-implemented image transferring system 200, according to some embodiments of the present invention. In some embodiments, information and images can be transferred wirelessly from a mobile image and information capturing application on a front-end user's mobile device 110 to a server 120 and then to an application 130. Based on instructions received from the back-end user via the application 130, for example, the server 120 can wirelessly transmit the received images to a financial institution 240 for electronic deposit into a first account. In some embodiments, the server 120 can receive a confirmation of the electronic deposit from the financial institution 240 and can transmit the confirmation to the front-end user's mobile device 110 and the application 130 via a wired or wireless connection, for example. Some or all of the system 200 can be hosted in a cloud computing environment. In some embodiments, multiple images can be transmitted to the financial institution simultaneously for electronic deposit.

Figure 3:
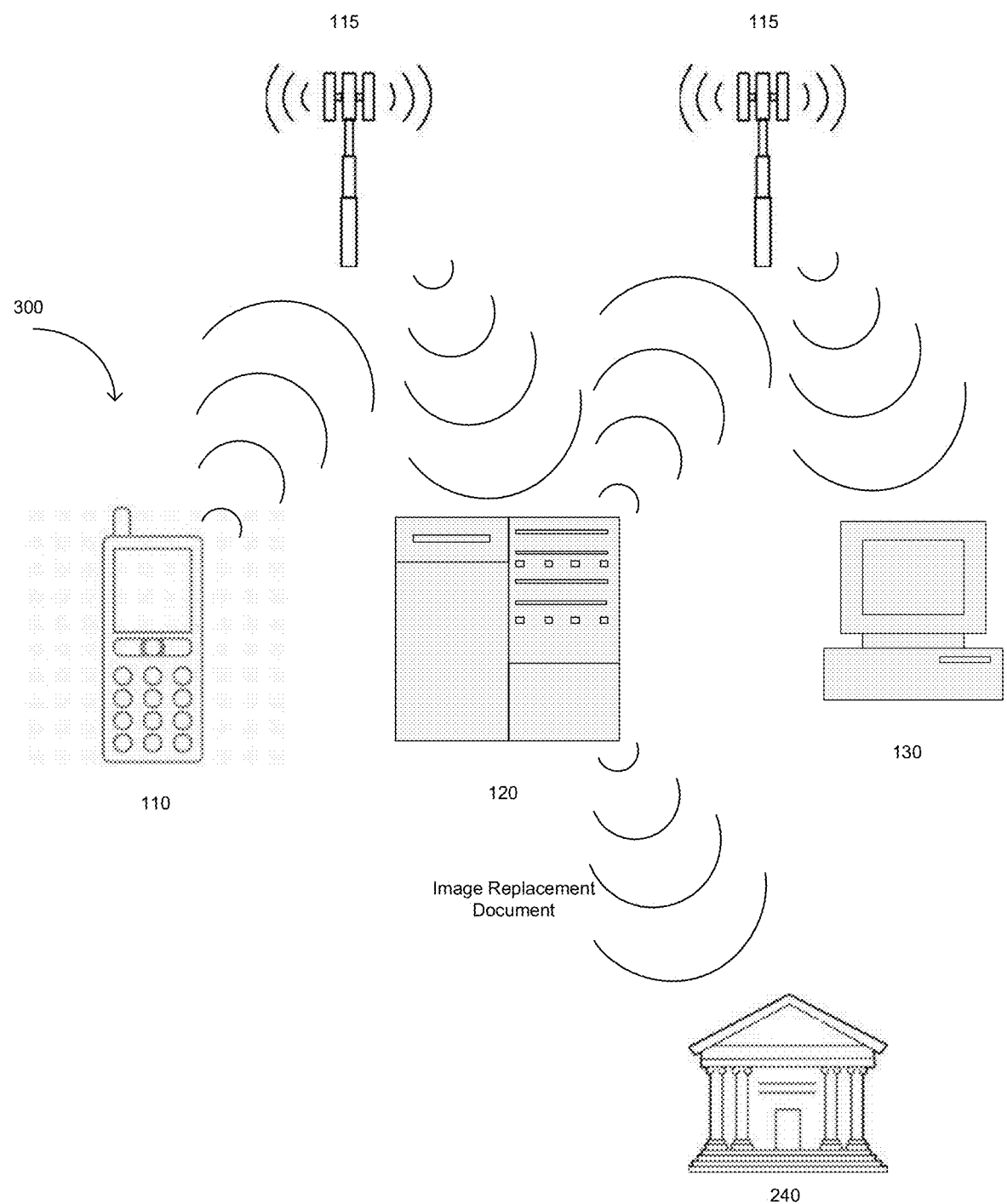
FIG. 3 depicts a system in which the server converts the received images of the negotiable bank instrument into a format that is suitable for electronic deposit and then transmits the converted images to the first financial institution, in accordance with some embodiments of the present invention.

FIG. 3 illustrates a flowchart of an exemplary computer-implemented image transferring system 300, according to some embodiments of the present invention. In this configuration, information and images can be transferred via a wired or wireless connection, for example and not limitation, from the mobile image and information capturing application on the front-end user's mobile device 110 to a server 120 to an application 130. In some embodiments, based on instructions received from the back-end user via the application 130, the server 120 can convert the received images to image replacement documents (IRDs) and can then transmit those IRDs to the financial institution 240 for electronic deposit into the first account. The server 120 can receive a confirmation of the electronic deposit from the financial institution 240 and can transmit the confirmation to the front-end user's mobile device 110 and the application 130 via a wired or wireless connection, for example. Some or all of the system 300 can be hosted in a cloud computing environment. In some embodiments, multiple IRDs can be transmitted to the financial institution simultaneously for electronic deposit.

Figure 4:
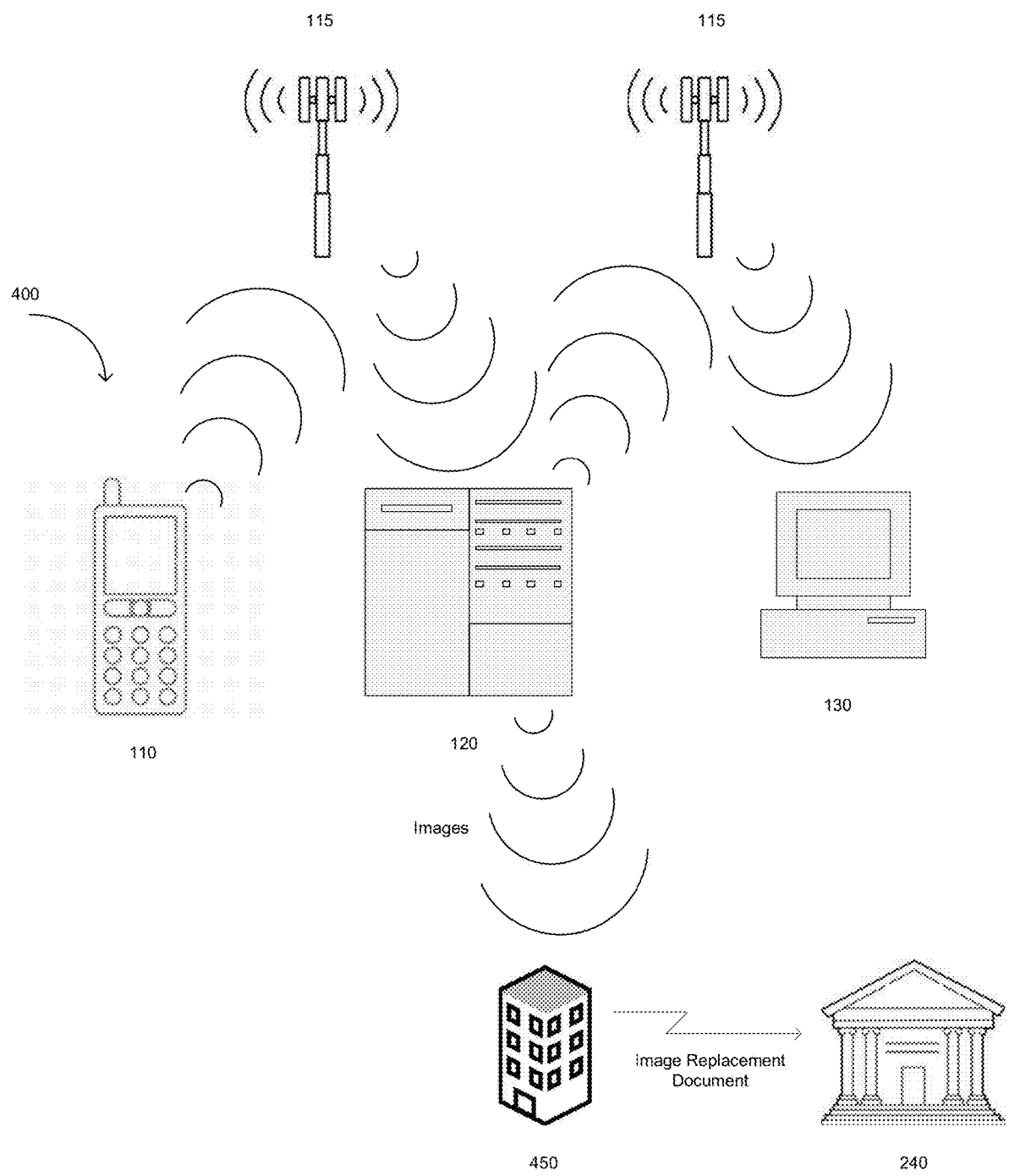
FIG. 4 depicts a system in which the server transmits the received images of the negotiable bank instrument to a third party processor for conversion into the format that is suitable for electronic deposit into the first account at the first financial institution, and the third party processor transmits the converted images to the first financial institution, in accordance with some embodiments of the present invention.

FIG. 4 illustrates a diagram of an exemplary computer-implemented image transferring system 400, according to some embodiments of the present invention. In this configuration, information and images can be transferred from the mobile image and information capturing application on the front-end user's mobile device 110 to a server 120, and then to an application 130. In some embodiments, based on instructions received from the back-end user via the application 130, the server 120 can transmit the received images to a third party processor 450 for conversion into IRDs. The third party processor 450 can then wirelessly transmit those IRDs to the financial institution 240 for electronic deposit into the first account. In some embodiments, the third party processor 450 can receive confirmation of the electronic deposit and can transmit that confirmation to the server 120. The server 120 can transmit the confirmation to the front-end user's mobile device 110 and the application 130 via a wired or wireless connection, for example. Some or all of the system 400 can be hosted in a cloud computing environment. In some embodiments, multiple images can be transmitted to the third party processor for conversion and electronic deposit.

Figure 5:
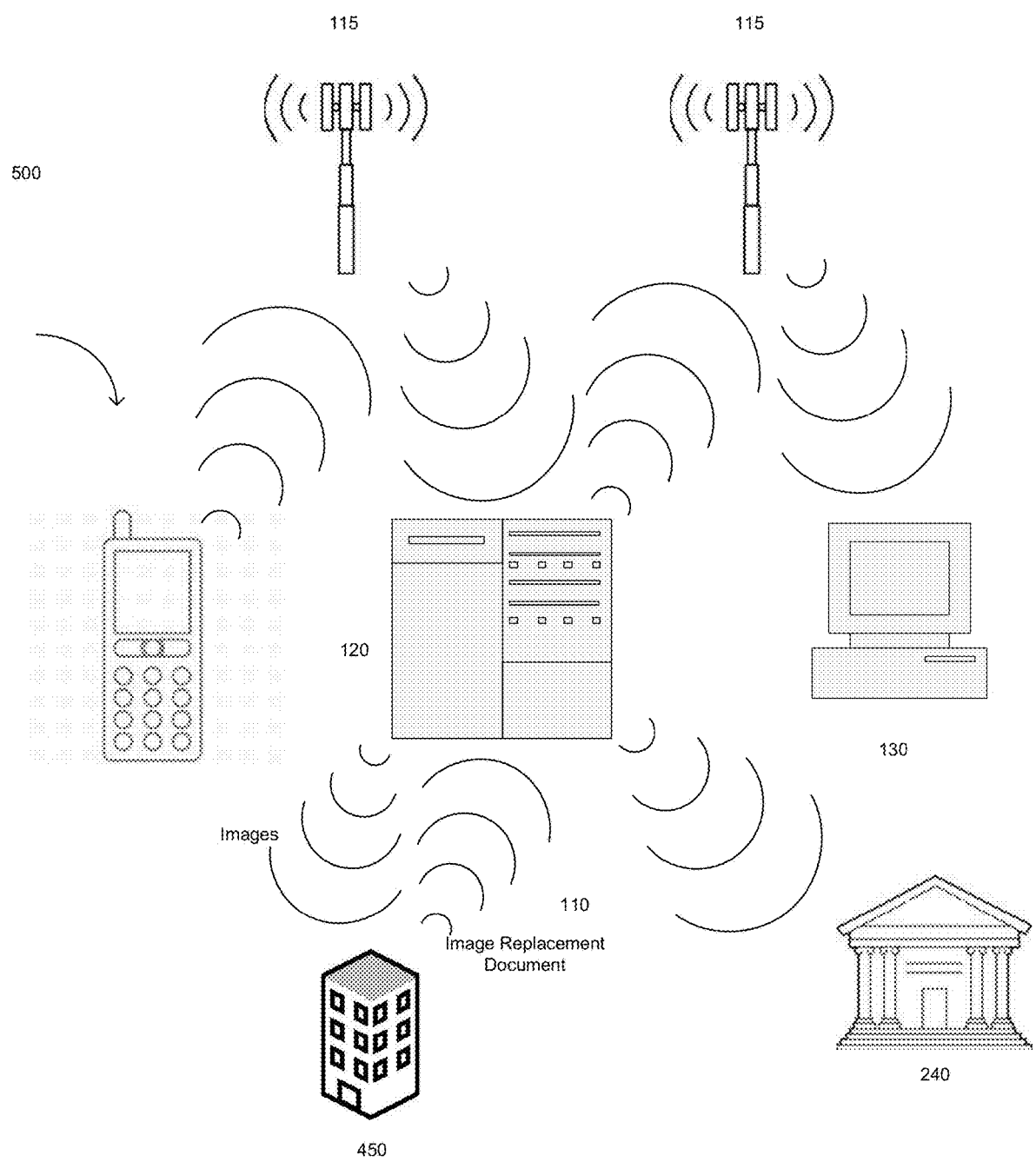
FIG. 5 depicts a system in which the server transmits the received images of the negotiable bank instrument to a third party processor for conversion into the format that is suitable for electronic deposit into the first account at the first financial institution, and the third party processor transmits the converted images to the server, in accordance with some embodiments of the present invention.

FIG. 5 illustrates a diagram of an exemplary computer-implemented image transferring system 500, according to some embodiments of the present invention. In some embodiments, information and images are transferred from the mobile image and information capturing application on the front-end user's mobile device 110 to a server 120 and, in some cases, to an application 130. Based on instructions received from the back-end user via the application 130, for example, the server 120 can transmit the received images to a third party processor 450 for conversion into IRDs via a wireless connection, for example. In some embodiments, the third party processor 450 can transmit those IRDs back to the server 120 via a wireless connection, for example. The server 120 can then wirelessly transmit the received IRDs to the financial institution 240 for electronic deposit into the first account. In some embodiments, the server 120 can receive a confirmation of the electronic deposit from the financial institution 240 and can transmit the confirmation to the front-end user's mobile device 110 and the application 130 via a wired or wireless connection, for example. Some or all of the system 500 can be hosted in a cloud computing environment. In some embodiments, multiple IRDs can be transmitted to the financial institution simultaneously for electronic deposit.

Figure 6:
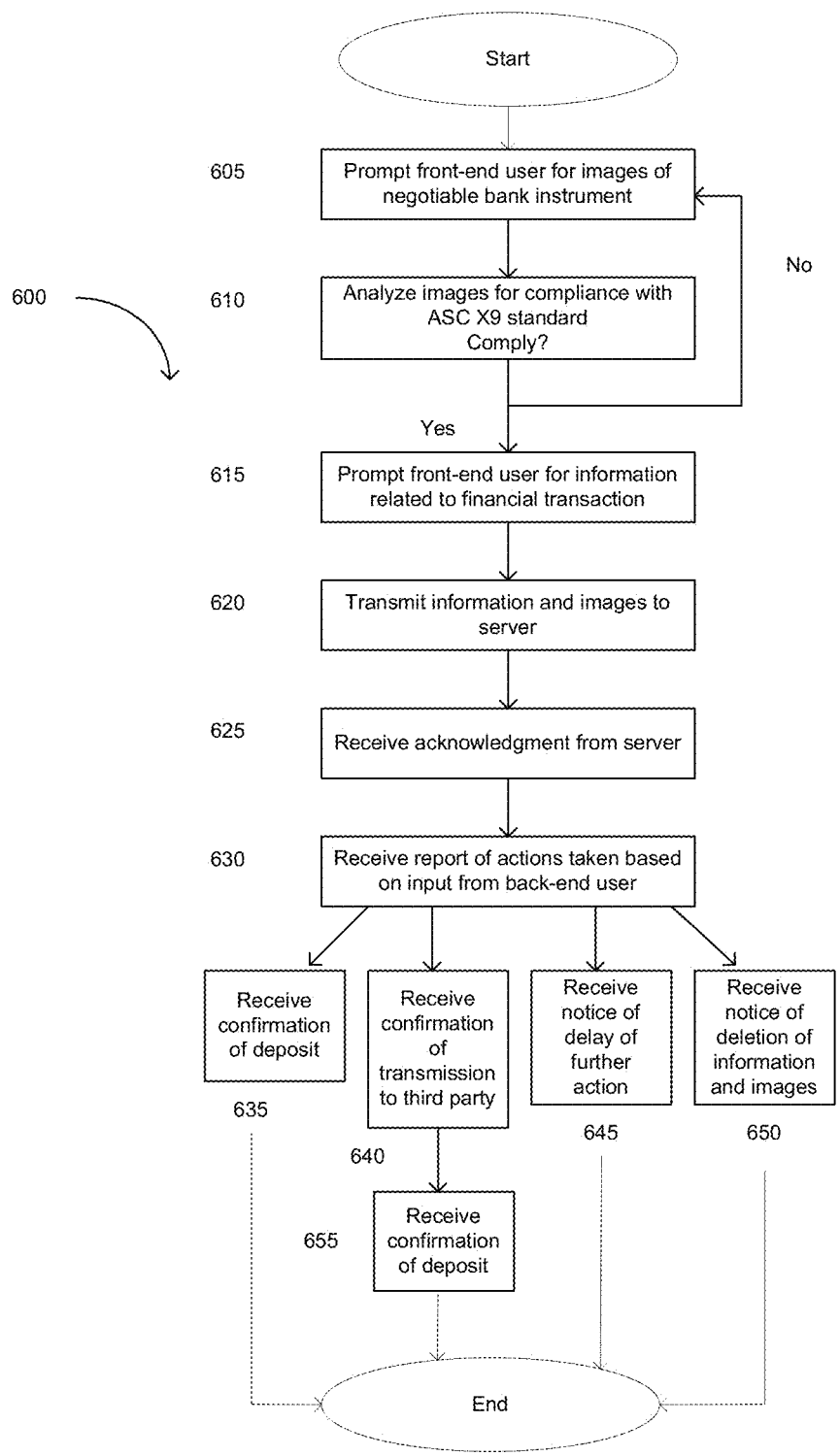
FIG. 6 is a flowchart depicting the interaction between the front-end user and the system, in accordance with some embodiments of the present invention.

FIG. 6 is a flowchart depicting a method of processing information and images from the view of the front-end user, in accordance with some embodiments of the present invention. In some embodiments, the front-end user can be prompted 605 to capture images of the front and back sides of the negotiable bank instrument using the camera of the mobile device, for example and not limitation. The images can then be analyzed 610 to determine their compliance with, for example, the ASC X9 standards and suitability for processing into an IRD. If the images do not comply with the standard, the front-end user can be prompted to capture additional images of the appropriate side(s) of the instrument.

The front-end user can also be prompted 615 to answer a series of questions designed to obtain necessary information related to the financial transaction, such as, for example and not limitation, the type of financial transaction, the amount of the financial transaction, the parties involved in the financial transaction and their roles (including the back-end user), the date of the financial transaction, identification of real property associated with the financial transaction, and the nature and purpose of funds associated with the financial transaction. In some embodiments of the method, the series of questions can be generated by the mobile image and information capturing application on the front-end user's mobile device 110.

Once the information and images have been successfully provided by the front-end user, the information and images can then be transmitted 620 to the server 120. In some embodiments, the back-end user can be specified by the front-end user. The server 120 can generate an acknowledgment of receipt that can be, for example, time- and/or date-stamped. In some embodiments, the server 120 can also transmit the acknowledgment 625 to the mobile device 110 of the front-end user as a confirmation of the transaction. In some embodiments, the server 120 can also generate and transmit a report 630 of the actions taken based on input received from the front end user, the back end-user, or both. The report can include, for example, a confirmation of electronic deposit 635, a confirmation of transmission 640 to a third party processor, a confirmation of electronic deposit 655 by the third party processor, a notice of delay of further action 645, and/or a notice of deletion of the information and images 650 by the server 120.

Figure 7A:
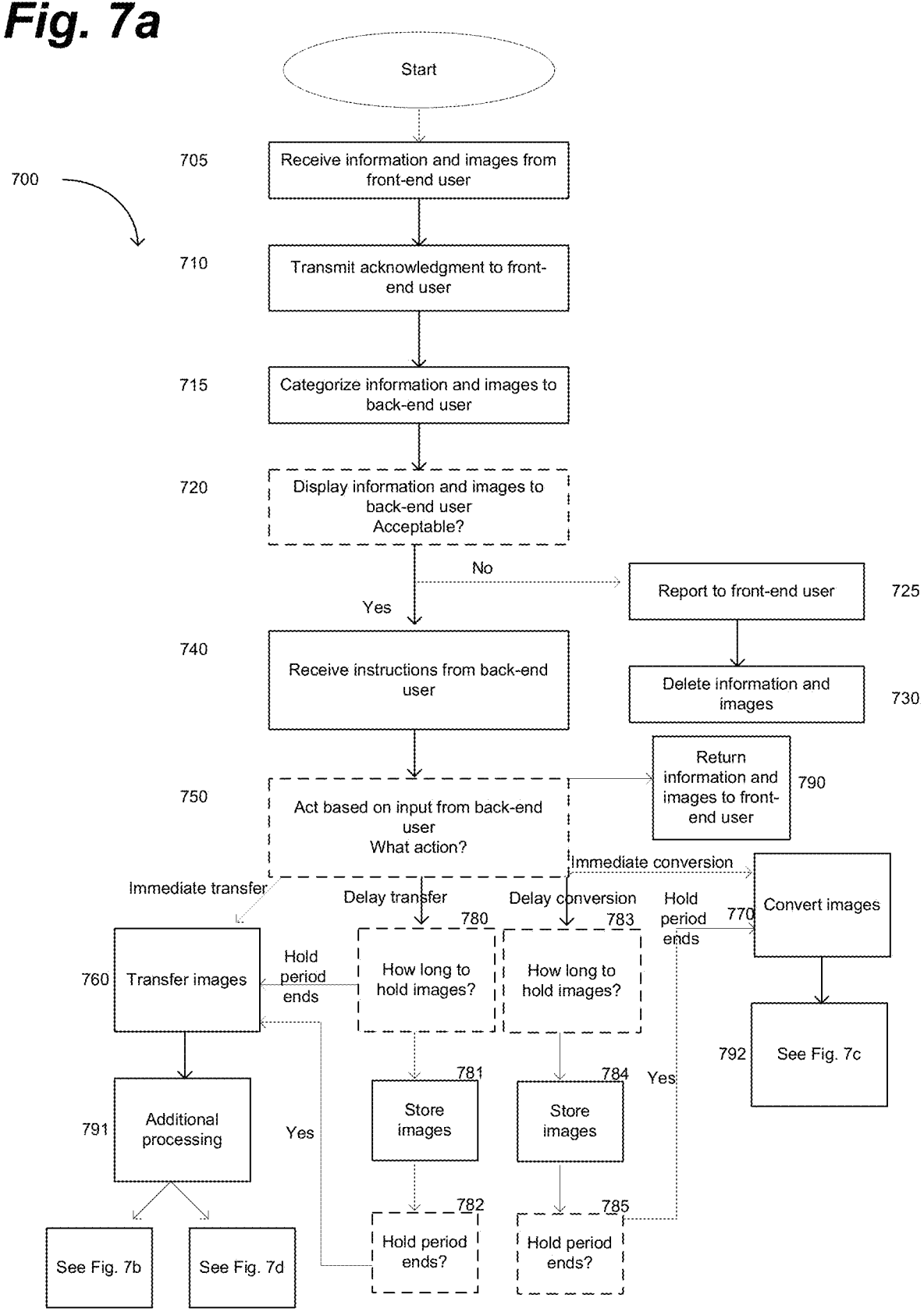
FIG. 7a is a flowchart depicting steps performed by the server in response to user input, in accordance with some embodiments of the present invention.

FIG. 7a is a flowchart depicting steps 700 performed by the server 120. In some embodiments, the server 120 can receive information and images 705 from the mobile device 110 of the front-end user. The server 120 can generate and transmit an acknowledgment of receipt of the information and images 710 to the mobile device 110 of the front-end user. In some embodiments, for the back-end user to easily access the information and images in the application 130, the server 120 can categorize 715 the information and images according to, for example, the type of financial transaction, and can further categorize the information and images according to the image of the front side of the negotiable bank instrument. The server 120 can display 720 the categorized information and images on the application 130 for the back-end user to review and verify the information and images. The review and verification performed by the back-end user can also serve to confirm, for example, that the information and images are related to the same financial transaction, that the negotiable bank instrument has the correct information, and that all necessary information for the financial transaction to be completed was provided by the front-end user. The amount and type of necessary information can depend on the type of financial transaction. In some embodiments, the necessary information can include, for example and not limitation, real property purchase contracts, leases, completed forms, or identification of the nature and purpose of funds associated with the transaction.

Once the back-end user has completed the review and verification process, the server 120 can receive instructions 740 from the back-end user for actions to be taken by the server 120 in regard to the information and images. The server 120 can also generate a report of the results of the back-end user's review and verification, as well as actions to be taken in regard to the information and images. If there is an error and/or inconsistency in the information and images found by the back-end user, or the images and information are not related to the same financial transaction, the server 120 can transmit a report 725 to the mobile device 110 of the front-end user and may also delete 730 the information and images.

There are several possible embodiments of the method in regard to the actions 750 that can be taken by the server 120 in response to the input received from the back-end user. For example, the server 120 can immediately transfer the images 760 and perform further processing 791. The server 120 can also delay transfer 780 of the images and can store the images 781 until a predetermined hold period ends 782. The length of the hold period can be specified, for example, by the front-end user or the back-end user. The server 120 can also immediately convert the images 770 into IRDs. The server can also delay conversion of the images 783 and store the images 784 until the hold period ends 785. The length of the hold period 785 for conversion of the images can be specified by the front-end user or the back-end user. The server 120 can also delay 780 transfer of the IRD and store the IRD 781 until the hold period ends 782. The length of the hold period 782 for transmission of the images to the financial institution or third party processor can be specified by the front-end user or the back-end user. The server 120 can also return the information and images 790 to the mobile device of the front-end user if, for example, the transaction is not completed.

Figure 7B:
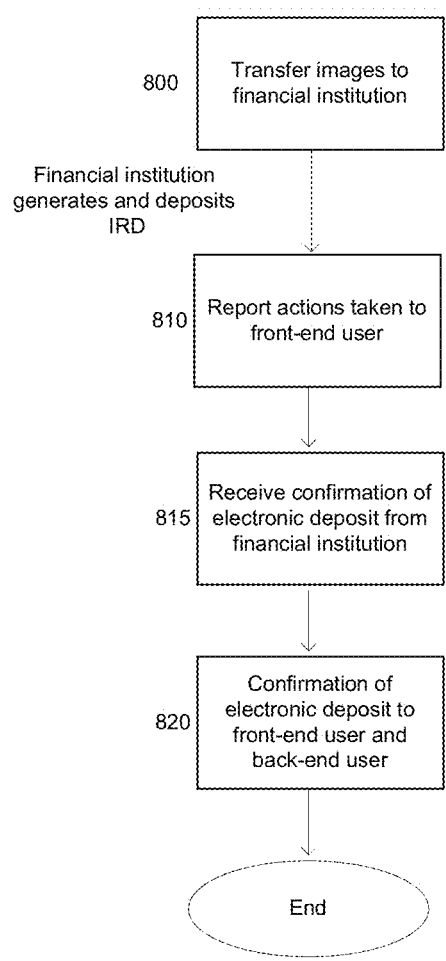
FIGS. 7b-7d are flowcharts depicting certain steps of the method depicted in FIG. 7a in further detail, in accordance with some embodiments of the present invention.
Figure 7C:
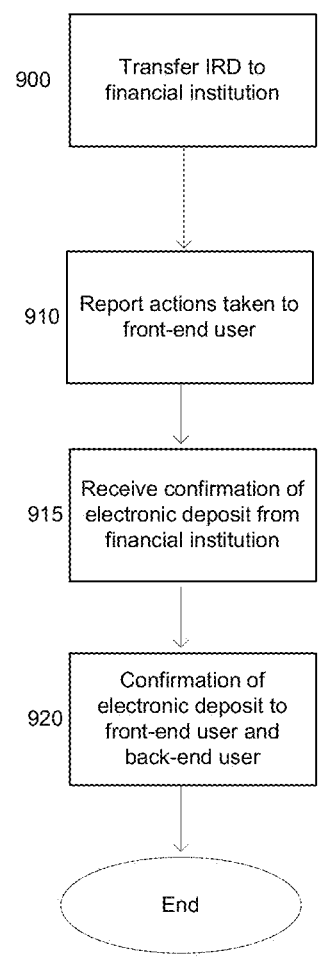
Figure 7D:
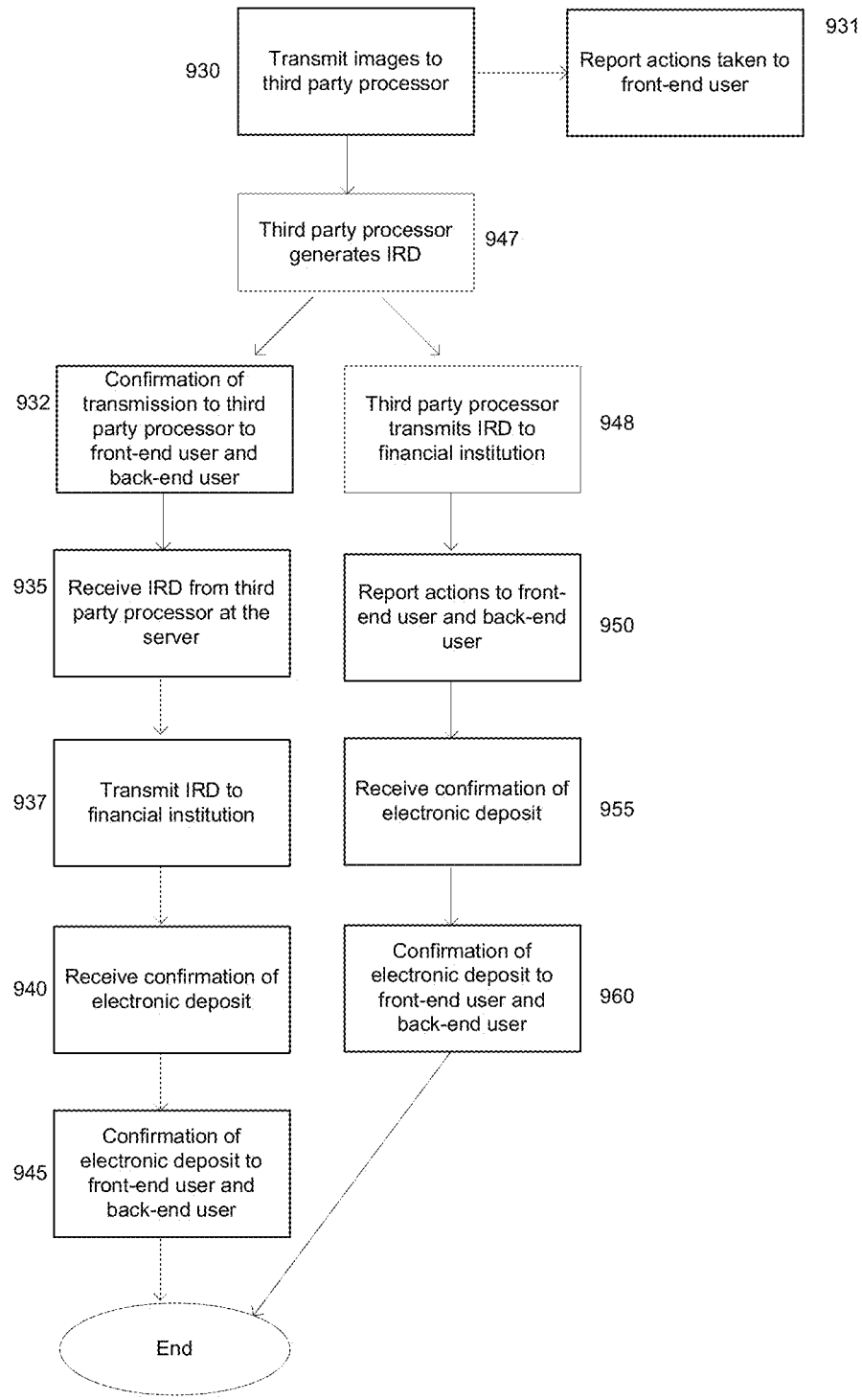

Further details of these different embodiments are depicted in FIGS. 7b-d. Specifically, FIG. 7b is a flowchart depicting an exemplary embodiment of the present invention in which the server 120 can transmit the received images of the negotiable bank instrument to the first financial institution 240 for electronic deposit into the first account. FIG. 7c depicts an exemplary embodiment of the present invention in which the server 120 can convert the received images of the negotiable bank instrument to a format that is suitable for electronic deposit and then can transmit the converted images to the first financial institution 240 for electronic deposit into the first account. FIG. 7d depicts an exemplary embodiment of the present method in which the server transmits the received images of the negotiable bank instrument to a third party processor 450 for conversion into a suitable form for electronic deposit into the first account at the first financial institution 240.

In some embodiments as depicted in FIG. 7b, upon receiving input indicating successful review and verification by the back-end user, the server 120 can transmit 800 the images of the negotiable bank instrument to the first financial institution 240 for deposit into the first account, and the images themselves can then be utilized by the financial institution 240, for example, to carry out the requested deposit. In some embodiments, transmission of the images 800 can occur upon receiving input indicating successful review and verification by the back-end user via the application 130. In this embodiment, the server 120 can generate the report 810 to the mobile device 110 of the front-end user that can include a confirmation that the information and images are related to the same financial transaction and that the server 120 has either immediately transmitted 760 the images of the negotiable bank instrument associated with the financial transaction to the first financial institution 240 for deposit into a first account, or that the server 120 is holding the images 780 of the negotiable bank instrument for deposit into the first account at a later date. In some embodiments, the server 120 can receive a confirmation of the electronic deposit 815 from the financial institution 240. The server can then transmit the confirmation 820 to the back-end user and the mobile device 110 of the front-end user. This confirmation can be, for example and not limitation, time- and/or date-stamped and can contain other information relevant to the transaction.

In some embodiments, as depicted in FIG. 7c, the server 120 can transmit 900 the IRD to the first financial institution 240 for deposit into the first account upon receiving input indicating successful review and verification by the back-end user via the application 130. This IRD can be generated from the images by methods well known in the art and discussed above. In some embodiments, the IRD can have all of the required information to meet the ASC X9 standards to be a true IRD and therefore a legal equivalent of the physical copy of the negotiable bank instrument. Conversion 770 of the images as depicted in FIG. 7a can occur upon receiving input indicating successful review and verification by the back-end user via the application 130.

In this embodiment, the report 910 generated by the server 120 can include a confirmation that the information and images are related to the same financial transaction and that the server 120 has either immediately converted 770 the images of the negotiable bank instrument associated with the financial transaction to an IRD as depicted in FIG. 7 and immediately transmitted 900 the IRD to the first financial institution 240 for deposit into the first account, or that the server 120 is holding either the conversion 783 of the images of the negotiable bank instrument associated with the financial transaction to an IRD for conversion at a later date and is storing 784 the IRD until that time or is holding the transmission 780 of the IRD to the first financial institution 240 for deposit into the first account at a later date and is storing 781 the information and images until that time. The length of the hold period can be specified, for example, by the front-end user or the back-end user. When the hold period ends 782, the IRD can be transferred 780. When the hold period ends 785, the images can be converted 770 and transmitted 800 to the financial institution 240. The length of either of the hold periods for conversion of the images or transmission to the financial institution can be specified by the front-end user or the back-end user. In this embodiment, the server 120 can receive a confirmation 915 of the electronic deposit from the financial institution 240. The server 120 can then transmit 920 the confirmation of the electronic deposit of the IRD to the back-end user and the mobile device 110 of the front-end user. This confirmation can be, for example, time- and/or date-stamped.

In another embodiment as depicted in FIG. 7d, the server 120 can transmit 930 the images of the negotiable bank instrument and related information to a third party processor 450 for conversion 947 of the images into an IRD, upon receiving input indicating successful review and verification by the back-end user via the application 130. This IRD can be generated from the information and images by methods well known in the art and discussed above and can have all required information to meet the ASC X9 standards to be a true IRD and a legal equivalent of the physical copy of the negotiable bank instrument. The server 120 can report 931 the transfer of the images from the server 120 to the third party processor 450 to the mobile device 110 of the front-end user and the application 130. In this embodiment, the report 931 generated by the server 120 can also include a confirmation that the information and images are related to the same financial transaction and that the server 120 has either immediately transmitted 760 the information and images of the negotiable bank instrument associated with the financial transaction to the third party processor 450 for electronic deposit into the first account at the first financial institution 240, or that the server 120 is holding the transmission 780 of the information and images to the third party processor 450 for transmission at a later date and is storing 781 the information and images until that time. The length of the hold period can be specified by either the front-end user or the back-end user. When the hold period ends 782, the IRD can be transferred 780. In this embodiment, the server 120 can also generate a confirmation of the transmission of the information and images to the third party processor 450 and transmit 932 the confirmation to the back-end user and the mobile device 110 of the front-end user. This confirmation can be, for example, time- and/or date stamped.

In some embodiments, as depicted in FIG. 7d, the third party processor 450 can transmit 935 the IRD back to the server 120 for electronic deposit in the first account at the first financial institution 240 rather than transmitting the IRD directly 948 to the financial institution. In this embodiment, the server 120 can transmit 937 the received IRD for electronic deposit in the first account at the first financial institution 240. The server 120 can report 940 the transmission of the IRD by the server 120 to the financial institution 240 to the mobile device 110 of the front-end user. In some embodiments, the server 120 can receive confirmation of the electronic deposit of the IRD from the financial institution 240 and can transmit 945 the confirmation to the back-end user and the mobile device 110 of the front-end user. This confirmation can be, for example, time- and/or date-stamped.

In another embodiment, as depicted in FIG. 7d, the third party processor can transmit 948 the IRD directly to the financial institution 240. The server 120 can report the transmission 950 of the IRD by the third party processor to the financial institution 240 to the back-end user and the mobile device 110 of the front-end user. The server can receive confirmation 955 of the electronic deposit from the third party processor 450 and can transmit 960 the confirmation of the electronic deposit of the IRD to the back-end user and the mobile device 110 of the front-end user. The confirmation can be, for example, time- and/or date-stamped.

Figure 8:
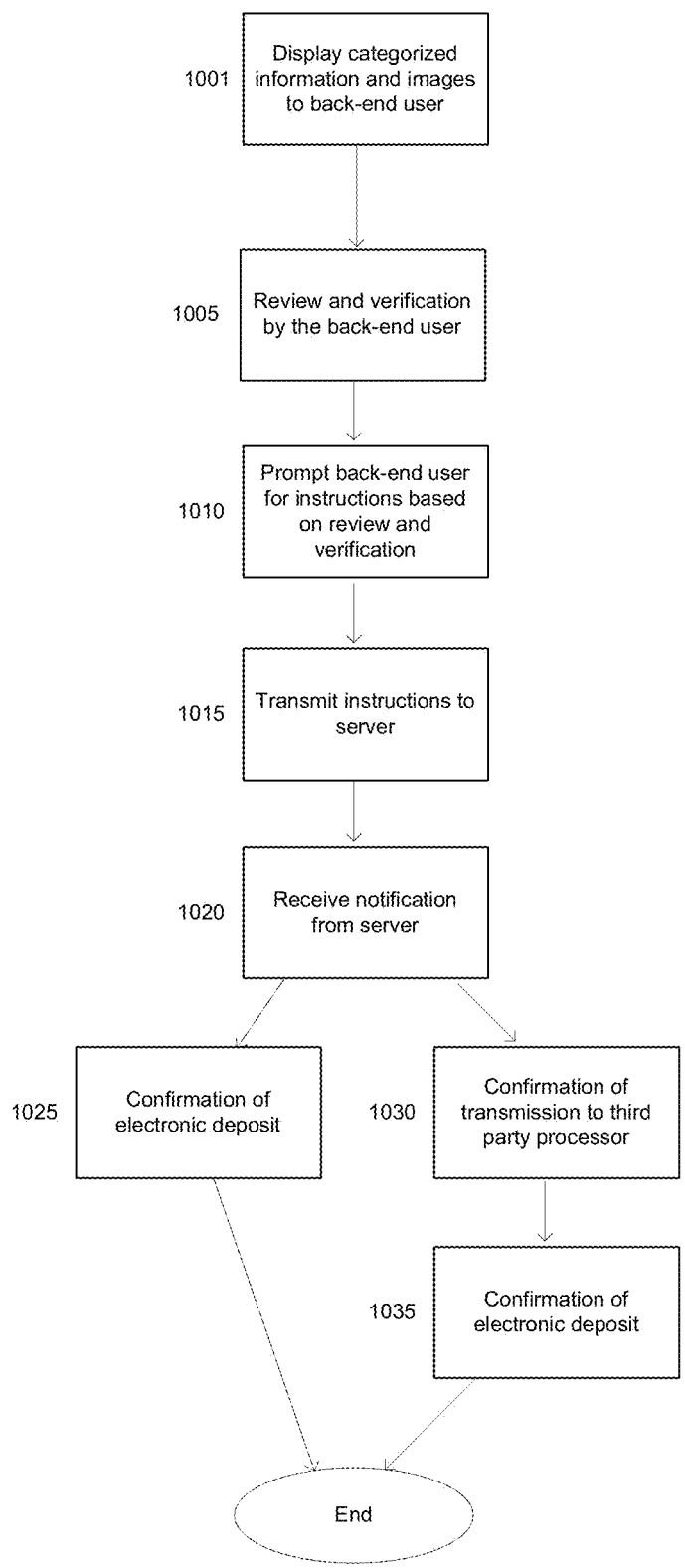
FIG. 8 is a flowchart depicting the interaction between the system and the back end user, in accordance with some embodiments of the present invention.

FIG. 8 is a flowchart depicting a method 1000 of obtaining input from the back-end user via the application 130. The application 130 can display 1001 the categorized information and images to the back-end user. The back-end user can review and verify 1005 the information and images for any errors and/or inconsistencies in the information and/or images, and can confirm, for example, that the information and images are related to the same financial transaction. The application 130 can prompt 1010 the back-end user for instructions resulting from the back-end user's review and verification. The application 130 can transmit 1015 the instructions to the server 120. The application 130 can receive notification 1020 from the server 120 resulting from the server 120 implementing the back-end user's instructions. The notification can include, for example and not limitation, a confirmation 1025 of electronic deposit of the negotiable bank instrument into the first account at the first financial institution 240, or a confirmation 1030 of transmission of the information and images to the third party processor 450, and a confirmation 1035 of electronic deposit of the negotiable bank instrument into the first account at the first financial institution 240.

While several possible embodiments are disclosed above, embodiments of the present invention are not so limited. For instance, while several possible configurations of methods, types of equipment, and connections have been disclosed, other suitable methods and systems could be selected without departing from the spirit of embodiments of the invention. For example, while the system is disclosed for use with a user's mobile device, the system could also be implemented in a kiosk or ATM type machine. In addition, the location and configuration used for various features of embodiments of the present invention can be varied according to a particular business or server location that requires a slight variation due to, for example, the space or power constraints. Such changes are intended to be embraced within the scope of the invention.

The specific configurations, choice of materials, and the size and shape of various elements can be varied according to particular design specifications or constraints requiring a device, system, or method constructed according to the principles of the invention. Such changes are intended to be embraced within the scope of the invention. The presently disclosed embodiments, therefore, are considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. A computer-implemented method comprising:
receiving at a server, sent wirelessly from a first application executing on a first computing device of a front-end user, information related to a financial transaction and a digital image of a negotiable bank instrument, the first application being configured to prompt the front-end user to capture the digital image, control a camera of the first computing device to capture the digital image, prompt the front-end user for responses to one or more questions related to the financial transaction, and indications of the responses as the information related to the financial transaction, the front-end user being a payer of the financial transaction, and the first computing device being remote from the server;
transmitting the information and the digital image from the server to a second application executing on a second computing device of a back-end user, the second application configured to:
display the information and digital image on the second computing device for review by the back-end user,
receive an indication of verification from the back-end user,
prompt, in response to receiving the indication of verification, the back-end user for instructions for the negotiable bank instrument, the instructions comprising an indication to hold the information and the digital image for a holding period specified by either the front-end user or the back-end user, and
receive the instructions for the negotiable bank instrument from the back-end user, the second computing device being unrelated to the server, the back-end user being a payee of the financial transaction, and the second computing device being remote from the server and the first computing device;
receiving, by the server and from the second computing device, the indication of verification and instructions for the negotiable bank instrument;
processing, by the server, the information and the digital image based on the instructions for the negotiable bank instrument received by the server and from the second computing device;
holding, by the server, the information and the digital image for deposit at a later date based on the holding period;
generating and transmitting, by the server and to the first computing device of the front-end user, a report based on the input received by the server and from the second computing device;
electronically depositing, by the server and after the holding period, the negotiable bank instrument into a first account at a financial institution by communicating with a financial institution server associated with the financial institution; and
generating and transmitting, by the server, an acknowledgment receipt from the server to the first computing device of the front-end user,
wherein first computing device, the second computing device, the server, and the financial institution server are mutually distinct.

2. The method of claim 1, further comprising:
generating, at the first computing device, a series of questions; and
prompting the front-end user of the first computing device to input the information related to the financial transaction.

3. The method of claim 2, wherein the information comprises one or more of:
- a type of financial transaction;
- an amount of the financial transaction;
- parties in the financial transaction;
- a date of the financial transaction;
- identification of real property associated with the financial transaction; and
- a nature and purpose of funds associated with the financial transaction.

4. The method of claim 2, wherein the questions are generated by the first application on the first computing device.

5. The method of claim 1 further comprising:
- analyzing the digital image of the negotiable bank instrument to determine if the digital image meets one or more predetermined criteria including ASC X9 standards; and
- transmitting the information and the digital image from the server to the second computing device only in response to determining that the digital image meets the one or more predetermined criteria.

6. The method of claim 5 further comprising prompting the front-end user of the first computing device to capture a new a digital image of the negotiable bank instrument if the digital image does not meet one or more predetermined criteria.

7. The method of claim 1, wherein the acknowledgment receipt from the server contains a date and time of the transmission of the information and the digital image to the financial institution.

8. The method of claim 1 further comprising categorizing, by the server, the information and the digital image based on a type of financial transaction specified by the front-end user of the first computing device and based on the digital image of the negotiable bank instrument.

9. The method of claim 1, further comprising one or more of:
- receiving input from the second computing device after review and verification that the information and the digital image are related to the same financial transaction, and
- receiving input from the second computing device after review and verification that the information and the digital image are not related to the same financial transaction.

10. The method of claim 1, further comprising deleting, by the server, the information and the digital image in response to receiving input received from the second computing device that the received information and the digital image are not related to a same financial transaction and/or contain an error.

11. The method of claim 1, wherein the server immediately transmits the information and the digital image to the financial institution server for electronic deposit into the first account based on input received from the second computing device.

12. The method of claim 11, wherein the first account is associated with one or more of the back-end user, the front-end user, a designee of the back-end user, and a designee of the front-end user.

13. The method of claim 1, wherein the report based on the input received from the second computing device comprises one or more of:
- notification that the information and the digital image are related to the same financial transaction;
- notification that the information and the digital image are not related to the same financial transaction;
- notification that the server is holding the information and the digital image for action at a later date;
- notification that the server has deleted the information and the digital image; and
- notification that the server has transmitted the information and the digital image to a financial institution for electronic deposit.

14. A computer-implemented method comprising:
- receiving at a server, sent wirelessly from a first application executing on a first computing device of a front-end user, information related to a financial transaction and a digital image of a negotiable bank instrument, the first application being configured to prompt the front-end user to capture the digital image, control a camera of the first computing device to capture the digital image, prompt the front-end user for responses to one or more questions related to the financial transaction, and indications of the responses as the information related to the financial transaction, the front-end user being associated with a payer of the financial transaction, and the first computing device being remote from the server;
- transmitting the information and the digital image from the server to a second application executing on a second computing device of a back-end user, second application configured to:
  - display the information and digital image on the second computing device for review by the back-end user,
  - receive an indication of verification from the back-end user,
  - prompt, in response to receiving the indication of verification, the back-end user for instructions for the negotiable bank instrument, the instructions comprising an indication to hold the information and the digital image for a holding period specified by either the front-end user or the back-end user, and
  - receive the instructions for the negotiable bank instrument from the back-end user, and the back-end user being associated with a payee of the financial transaction, and the second computing device being remote from the server and the first computing device;
- receiving, by the server and from the second computing device, the indication of verification and instructions for the negotiable bank instrument;
- processing, by the server, the information and the digital image based on the instructions for the negotiable bank instrument received by the server and from the second computing device;
- holding, by the server, the information and the digital image for deposit at a later date based on the input received by the server and from the second computing device that negotiable bank instrument corresponds to the financial transaction, the input received by the server and from the second computing device comprising an indication to hold the information and the digital image for a holding period specified by either the front-end user or the back-end user;
- converting, by the server, the digital image of the negotiable bank instrument into a format that is suitable for electronic deposit based on the input received from the second computing device;
- electronically depositing, by the server, the negotiable bank instrument into a first account at a financial institution associated with a party selected from the group consisting of the front-end user and a third party based on the input received from the back-end user by transmitting the converted digital image to a financial institution server associated with the financial institution after the holding period; and generating and transmitting confirmation of the electronic deposit of the converted digital image from the server to the first and second computing devices, wherein first computing device, the second computing device, the server, and the financial institution server are mutually distinct.

15. The method of claim 14, wherein the conversion of the digital image of the negotiable bank instrument occurs upon receiving input from the second computing device that the received information and the digital image are related to the same financial transaction.

16. The method of claim 14, wherein the conversion of the digital image of the negotiable bank instrument comprises generating an image replacement document, and wherein the image replacement document contains an image of a front side or back side of the negotiable bank instrument and information related to the financial transaction.

17. The method of claim 14, wherein the server immediately transmits the converted digital image of the negotiable bank instrument to the financial institution for deposit into the first account based on input from the second computing device.

18. A computer-implemented method comprising:

receiving at a server, sent wirelessly from a first application executing on a first computing device of a front-end user, information comprising one or both of identification of real property associated with a financial transaction and a nature and purpose of funds associated with the financial transaction, and a digital image of a negotiable bank instrument, the first application being configured to prompt the front-end user to capture the digital image with a camera of the first computing device, prompt the front-end user for responses to one or more questions related to the financial transaction, and indications of the responses as the information related to the financial transaction, the front-end user being associated with a payer of the financial transaction, and the first computing device being remote from the server;

transmitting the information and the digital image from the server to a second application executing on a second computing device of a back-end user, second application configured to:

display the information and digital image on the second computing device for review and verification by the back-end user, receive an indication of verification from the back-end user, prompt, in response to receiving the indication of verification, the back-end user for instructions for the negotiable bank instrument, the instructions comprising an indication to hold the information and the digital image for a holding period specified by either the front-end user or the back-end user, and receive the instructions for the negotiable bank instrument from the back-end user, the back-end user being associated with a payee of the financial transaction, and the second computing device being remote from the server and the first computing device;

generating and transmitting an acknowledgment receipt from the server to the first computing device of the front-end user;

receiving, by the server and from the second computing device, the indication of verification and instructions for the negotiable bank instrument;

processing, by the server, of the information and the digital image based on the instructions for the negotiable bank instrument received by the server and from the second computing device;

generating and transmitting, by the server and to the first computing device of the front-end user, a report based on input received by the server from the second computing device;

transmitting the information and the digital image to a remote third party processor for processing for electronic deposit into a first account at a financial institution based on input received on the second computing device from the back-end user; and generating and transmitting, by the server, confirmation of the transmission of the information and the digital image to the first and second computing devices, wherein first computing device, the second computing device, the server, and the third party processor are mutually distinct, wherein the server holds the information and the digital image for transmission at a later date based on the input from the back-end user, and wherein the later date can be specified by the front-end user with the information from the first computing device or by the back-end user with the input from the second computing device.

19. The method of claim 18, wherein the transmission of the information and the digital image occurs upon receiving input from the back-end user that the information and the digital image are related to the same financial transaction.

20. The method of claim 18, wherein the server immediately transmits the information and the digital image to the third party processor.

21. The method of claim 18, wherein the information and the digital image are suitable for use by the third party processor for electronic deposit at a financial institution.

22. The method of claim 21, wherein the third party processor performs additional processing of the digital image and information to generate an image replacement document suitable for electronic deposit at a financial institution.

23. The method of claim 18, wherein the server receives the processed digital image from the third party processor and transmits the processed digital image to a first financial institution for deposit into a first account based on the input from the back-end user.

24. The method of claim 23, wherein the first account is associated with one or more of the back-end user, the front-end user, a designee of the back-end user, and a designee of the front-end user.

25. The method of claim 23, further comprising:

generation and transmission of confirmation of the electronic deposit of the processed digital image from the server to the back-end user and the first computing device of the front-end user.

* * * * *